A. H. MARHENKE.
DRAFT REGULATOR.
APPLICATION FILED MAR. 8, 1913.
1,103,149. Patented July 14, 1914.
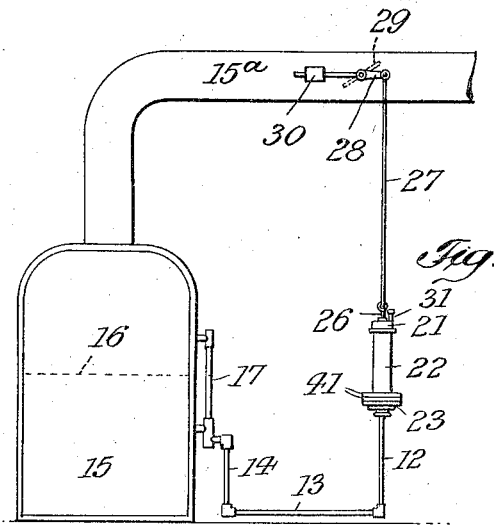
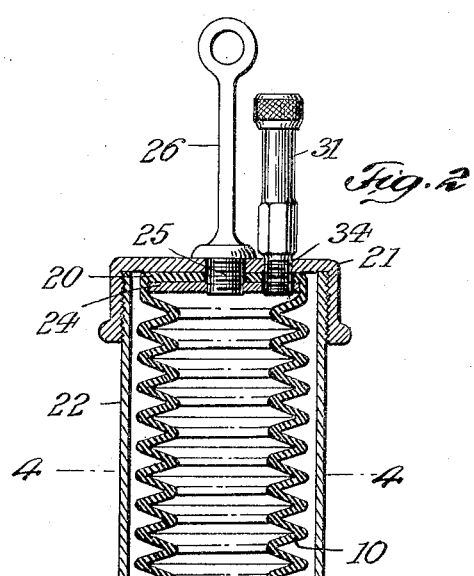
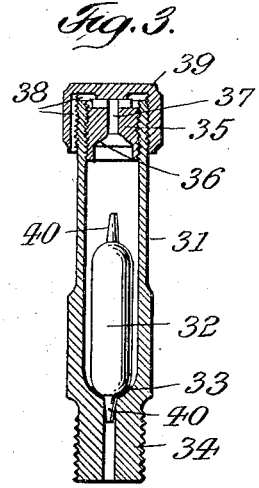
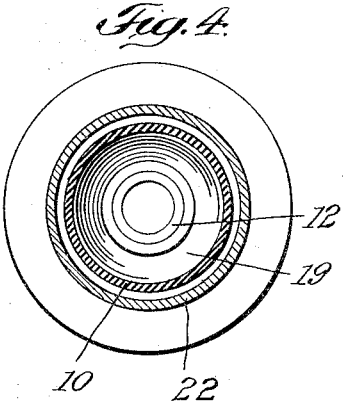
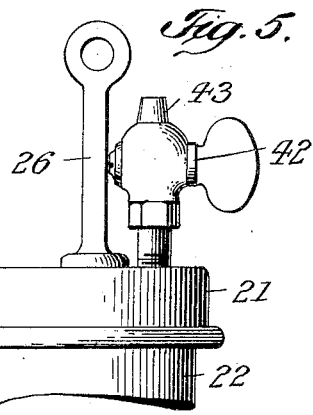

UNITED STATES PATENT OFFICE.

AUGUST H. MARHENKE, OF NEW YORK, N. Y.

DRAFT-REGULATOR.

1,103,149.

Specification of Letters Patent. Patented July 14, 1914.

Application filed March 8, 1913. Serial No. 752,834.

*To all whom it may concern:*

Be it known that I, AUGUST H. MARHENKE, a citizen of the United States, residing at New York city, county of Bronx, and State of New York, have invented a new and Improved Draft-Regulator, of which the following is a specification.

This invention relates to a novel draft regulator for low pressure steam boilers, more particularly used for heating purposes, the construction being such that a delicate regulation will be automatically effected and maintained even after prolonged use.

In the accompanying drawing: Figure 1 is a front elevation of a boiler provided with my improved draft regulator; Fig. 2 a longitudinal section through the regulator; Fig. 3 a detail of the vent; Fig. 4 a cross section on line 4—4, Fig. 2, and Fig. 5 a side view of part of the regulator showing a modified construction of the vent.

The regulator comprises essentially a collapsible member shown as an accordion-plaited hose 10 made of rubber or similar elastic material and expansible to a pronounced extent in an axial direction. At its bottom, hose 10 is provided with an inwardly extending flange 11 adapted to accommodate the upper threaded end of a stand pipe 12 which is by pipes 13, 14 connected to the boiler 15 at a convenient point below its water level 16, the drawing showing said connection to be made by means of the gage 17. In order to tightly secure hose 10 to pipe 12, the latter is provided with a fixed collar 18 against which flange 11 may be clamped by means of a disk 19 threaded on pipe 12 on the inside of the collapsible member. At its top, hose 10 is provided with a flange 20 which is clamped to the cap or head 21 of a protective cylindrical housing 22 that encompasses the hose and is guided along tube 12 by means of a lower apertured cap 23. Flange 20 is held to cap 21 by means of an inner disk 24 into which is tapped the threaded shank 25 of a coupling member 26, whereby cap 21 and disk 24 are tightly drawn against flange 20. Member 26 is by rope or chain 27 operatively connected to an arm 28 of a damper 29 counterweighted as at 30 and adapted to control the flue 15ᵃ of boiler 15.

Upon head 20 is mounted the casing 31 of a double-acting float valve 32, said casing being provided with a lower valve seat 33 and with a hollow stem 34 screwed into said head and passing through apertures of flange 20 and disk 24 so as to communicate with the interior of hose 10 and at the same time make more secure the connection between the cap 21 and the disk 24. At its upper end, casing 31 contains a threaded plug 35 having valve seat 36 and a communicating T-shaped air duct 37. This duct permanently communicates with the atmosphere by a duct 38 provided in a cap 39 of casing 31. In order to properly center valve 32 in its lower and upper positions, it is provided with axially arranged pins 40 adapted to enter stem 34 and plug 35 respectively.

During operation, hose 10 and pipes 12, 13, 14 should be constantly filled with water, the weight of housing 22 together with the parts carried thereby being so calculated as to overbalance weight 30 and thus hold damper 29 in its fully opened position, as long as underpressure exists in boiler 15. When the boiler pressure rises, such pressure will be communicated through pipes 14, 13, 12, forcing additional water into the hose and causing the latter to expand to a corresponding extent, thereby lifting head 21 together with housing 22, permitting the counterweight 30 to correspondingly tilt or close damper 29 to reduce the flue draft.

During the fluctuations of the boiler pressure, and more particularly during a rapid fall of such pressure, suction is liable to be created within hose 10, so that air will be drawn into the same either by leakage or from the water which of course always contains a small percentage of air. Were this air allowed to accumulate, as I have found by extensive practice that it does as a result of repeated fluctuations of temperature, when no air vent is employed, it would gradually fill hose 10 to such an extent as to seriously impede its proper function. By providing the hose with an automatic valve-controlled vent, as described, a rise of pressure in the hose will cause an expulsion through casing 31 of any air which may be adjacent the vent, the valve 32 being lifted from its seat 33 by such pressure. When all air has been thus expelled and water enters casing 31, valve 32 will be floated against its seat 35, so that the egress of the water is effectively checked, in which position the valve will be maintained during normal operation. It will thus be seen that by the means described, the hose 10 will be automatically freed from all accumulation of air, while at the same time, the egress of water at its upper end is prevented, so that sensitive operativeness of the device will at all times be insured.

In mounting the regulator, its elevation above the water level of the boiler should be so selected as to correspond to the steam pressure desired to be maintained, the elevation of the hose increasing with increase in steam pressure. The employment of a double-acting vent valve of the nature herein set forth makes it expedient to locate the regulator above the normal water level in the boiler so as to take advantage of the increased boiler pressure, without being disturbed by accumulations of air, a fact practically impossible when such vent is not used. When the regulator is arranged above the normal water level in the boiler, as shown in Fig. 1, the water column in the regulator is sustained, even at low boiler pressure, by virtue of the valve seating at 33. After the device has been thus mounted, the steam pressure may be regulated within certain limits by weights 41 placed upon head 23.

Various modifications in the above described arrangement will suggest themselves without departing from the spirit of my invention. Thus coupling member 26 may be omitted and valve casing 31 utilized to connect the hose-flange 20 to head 21 and also to connect said head with chain 27. So also, if desired, the automatically operable valve 32 may be replaced by a manually operable valve 42 controlling the vent 43 as shown in Fig. 5.

I claim:

1. In a draft regulator for low pressure steam boilers, the combination with a boiler and a draft flue associated therewith, of a damper in the flue, a vertical stand pipe extending above the normal water level in the boiler, water connections between the boiler and said stand pipe providing free communication between them, a collapsible member secured to the upper open end of said stand pipe, a tubular housing connected to another portion of said collapsible member and inclosing said member, said housing being movable downwardly during the collapsing of said member, the lower end of the housing having loose slidable engagement with the stand pipe, connections between the housing and said damper whereby the changes of position of the housing control the operation of the damper, and double-acting vent means carried by the housing and communicating with the interior of the collapsible member serving to allow free egress of air but preventing egress of water therefrom or ingress of air to the interior thereof, whereby the collapsible member is maintained full of water through the stand pipe irrespective of all changes of position of said member and housing.

2. In a draft regulator of the character set forth, the combination with a stationary vertical stand pipe, of a tubular housing surrounding the upper end of the stand pipe and slidable vertically therealong, a collapsible and expansible member within the housing hermetically connected to the upper end of the stand pipe and adapted to be maintained full of water through the stand pipe, the upper end of the collapsible member acting to lift the housing, and an automatic double-acting vent valve carried by the upper portion of the housing and communicating with the interior of the collapsible member, said vent valve serving to allow the egress of air from the interior of the member and also preventing outflow of water therefrom or the inflow of air thereto.

AUGUST H. MARHENKE.

Witnesses:
ARTHUR E. ZUMPE,
KATHERYNE KOCH.